(12) United States Patent
Lee

(10) Patent No.: US 9,118,055 B2
(45) Date of Patent: Aug. 25, 2015

(54) BATTERY PACK

(71) Applicant: Samsung SDI Co., Ltd., Yongin, Gyeonggi-do (KR)

(72) Inventor: Jun-Ho Lee, Yongin (KR)

(73) Assignee: Samsung SDI Co., Ltd., Yongin (KR)

( * ) Notice: Subject to any disclaimer, the term of this patent is extended or adjusted under 35 U.S.C. 154(b) by 171 days.

(21) Appl. No.: 13/743,564

(22) Filed: Jan. 17, 2013

(65) Prior Publication Data

US 2014/0030566 A1 Jan. 30, 2014

(30) Foreign Application Priority Data

Jul. 25, 2012 (KR) .................. 10-2012-0081402

(51) Int. Cl.
| | |
|---|---|
| *H01M 2/10* | (2006.01) |
| *H01M 10/04* | (2006.01) |
| *H01M 2/20* | (2006.01) |
| *H01M 10/613* | (2014.01) |
| *H01M 10/625* | (2014.01) |
| *H01M 10/647* | (2014.01) |
| *H01M 10/6557* | (2014.01) |

(52) U.S. Cl.
CPC .......... *H01M 2/1016* (2013.01); *H01M 2/1022* (2013.01); *H01M 2/1077* (2013.01); *H01M 10/0481* (2013.01); *H01M 2/206* (2013.01); *H01M 10/5004* (2013.01); *H01M 10/5016* (2013.01); *H01M 10/5032* (2013.01); *H01M 10/5059* (2013.01)

(58) Field of Classification Search
CPC ............ H01M 2/1016; H01M 2/1022; H01M 2/1077; H01M 2/10
USPC .............................................. 429/90, 99
See application file for complete search history.

(56) References Cited

U.S. PATENT DOCUMENTS

| | | | | |
|---|---|---|---|---|
| 3,582,030 A | * | 6/1971 | Barrett, Jr. ................... | 248/68.1 |
| 2006/0214631 A1 | * | 9/2006 | Yoon et al. .................... | 320/112 |
| 2009/0155679 A1 | * | 6/2009 | Zhu et al. ...................... | 429/151 |
| 2011/0117401 A1 | * | 5/2011 | Lee et al. ........................ | 429/82 |

FOREIGN PATENT DOCUMENTS

| | | |
|---|---|---|
| JP | 05-028728 | 4/1993 |
| JP | 05-056546 | 7/1993 |
| JP | 2011-009178 | 1/2011 |
| KR | 10-2011-0055371 | 5/2011 |

* cited by examiner

*Primary Examiner* — Gary Harris
(74) *Attorney, Agent, or Firm* — Knobbe Martens Olson & Bear LLP

(57) ABSTRACT

A battery pack that has end plates and side plates so as to define an opening. The end plates and side plates are interconnected to inhibit swelling of the batteries in direction of the end plates. The battery pack includes a top plate that is interconnected to the side plates so as to maintain an interval between the side plates to inhibit swelling of the batteries in the direction of the side plates.

17 Claims, 6 Drawing Sheets

BATTERY PACK

RELATED APPLICATIONS

This application claims the benefit of Korean Patent Application No. 10-2012-0081402, filed on Jul. 25, 2012, in the Korean Intellectual Property Office, the disclosure of which is incorporated herein in its entirety by reference.

BACKGROUND

1. Field

One or more embodiments of the present invention relate to a battery pack.

2. Description of the Related Art

Typically, rechargeable batteries, unlike primary batteries that are not chargeable, are batteries that are charged and discharged. Rechargeable batteries are used as power sources for mobile devices, electric vehicles, hybrid vehicles, electric bicycles, and uninterruptible power supplies, etc. Batteries are used in the form of a single battery cell, or in the form of a battery pack formed by connecting a plurality of battery cells into one unit.

Small mobile devices, such as cellular phones, are operative with the output and capacity of a single battery for a predetermined period of time. However, when long-term driving and high-power driving are required, for example, when electric vehicles and hybrid vehicles which require high power consumption are used, a battery pack is more often used due to its increased output and capacity, and an output voltage or output current of a battery pack may increase according to the number of battery cells in the pack.

A battery pack requires an assembly structure for connecting a plurality of battery cells into one single assembly, and such an assembly structure provides a connecting force for integrating a plurality of battery cells. For example, a lithium ion battery may be used as a battery cell. However, although the performance of the lithium ion battery may not decrease even when charging and discharging are repeatedly performed, during charging, an anode may expand while lithium ions move. In particular, in the case of a battery pack formed by connecting the plurality of battery cells, even when each of the battery cells expands slightly, the battery pack including the battery cells may expand by 5 to 10%. As described above, when the battery pack is significantly deformed, electric resistance of battery cells increases and electric characteristics thereof may decrease.

Further, when a distortion moment is applied to a battery pack due to an external element, a distortion deformation may occur due to the lack of rigidity, and in this case, charging and discharging characteristics due to the deformation of the battery pack may deteriorate.

SUMMARY

According to one or more embodiments of the present invention, a battery pack includes a pair of end plates arranged to face each other; a plurality of battery cells arranged between the end plates in a first direction; a pair of side plates that cover facing side surfaces of the battery cells and are coupled to the end plate; and a top plate that maintains an interval between the end plates constant and an interval between the side plates constant and is located above in a protruding direction of electrode terminals of the battery cells.

For example, the top plate may include: a base frame extending in the first direction between the end plates; and first and second support frames extending from the base frame toward first and second side plates, wherein the first side plate is different from the second side plate.

For example, the first and second support frames may extend in a second direction perpendicular to the first direction.

For example, an end of each of the first and second support frames may integrally extend from the base frame and the other end of each of the first and second support frames may have a bending portion that faces the first or second side plate.

For example, the bending portion may have a connection coupling member that is coupled to a through-hole coupling member passing through the first and second side plates.

For example, the through-hole coupling member and the connection coupling member may respectively include a bolt and a nut.

For example, the battery pack may further include a plurality of bus bars that electrically connect electrode terminals of neighboring battery cells to each other, and the first and second support frames may extend through an interval between the bus bars.

For example, the first and second support frames may be arranged in a zigzag shape along a lengthwise direction of the base frame.

For example the top plate may include: a base frame and a support frame which respectively extend in first and second directions, wherein the first direction is different from the second direction; and a bead portion that is attached to at least one of the base frame and the support frame to compensate for mechanical rigidity and has a plate shape.

For example, the bead portion may include: a first bead portion extending in the first direction on the base frame; and a second bead portion extending in the second direction across the base frame and the support frame.

For example, the top plate may have a rigidity reinforcing portion for reinforcing mechanical rigidity, wherein the rigidity reinforcing portion is bent.

For example, the top plate may include a base frame and a support frame which respectively extend in first and second directions, wherein the first direction is different from the second direction, and the rigidity reinforcing portion is bent in opposite directions on sides of the base frame.

For example, the rigidity reinforcing portion may be arranged in the lengthwise direction of the base frame, and may be a plurality of bent portions that are individualized by cutting portions, and the support frame extends through the cutting portions.

For example, the side plates may further include bent projection steps that cover a portion of a bottom of the battery cells and are bent in a direction in which the bent projection steps face each other.

For example, the bent projection steps of the side plates may be coupled to a flange of end plates.

For example, the battery pack may further include: a bus bar for electrically connecting electrode terminals of neighboring battery cells, and an interconnection lines guide that is provided on the top plate and guides a plurality of interconnection lines connected to the electrode terminals of battery cells or the bus bar.

For example, the interconnection lines guide may include a plurality of hook-shaped fragments arranged in the first direction, and the interconnection lines are pulled together by a tie member coupled to the interconnection lines guide.

For example, the interconnection lines may include cell balancing interconnection lines connected to the battery cells, and temperature measuring interconnection lines connected to the bus bar, wherein the cell balancing interconnection lines and the temperature measuring interconnection lines are pulled together along the interconnection lines guide and extend in the first direction.

For example, an assembly direction display unit may be provided on the top plate to indicate an extension direction of the interconnection lines connected to the electrode terminal of the battery cell or the bus bar.

For example, the battery pack may further include: an insulating cover member coupled to the top plate, and a connection coupling member to which a through-hole coupling member passing through the insulating cover member is coupled, formed on the top plate.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
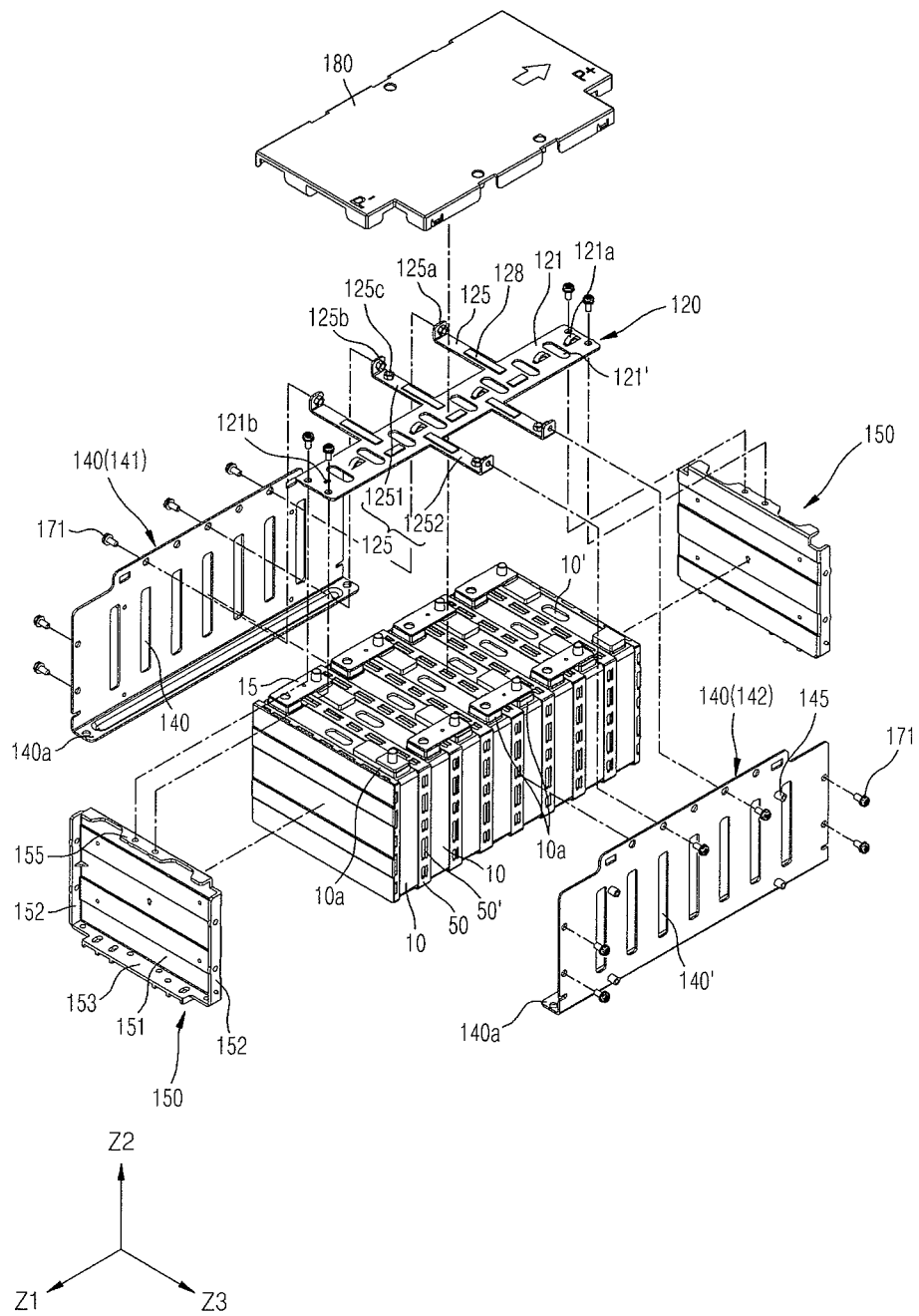
FIG. 1 is an exploded perspective view of a battery pack according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, a battery pack according to an embodiment of the present invention is described with reference to attached drawings.

FIG. 1 is an exploded perspective view of a battery pack according to an embodiment of the present invention. Referring to FIG. 1, the battery pack includes a plurality of battery cells 10 that are arranged in a row in a direction (Z1 direction), and plates 120, 140, and 150 surrounding the battery cells 10.

Figure 2:
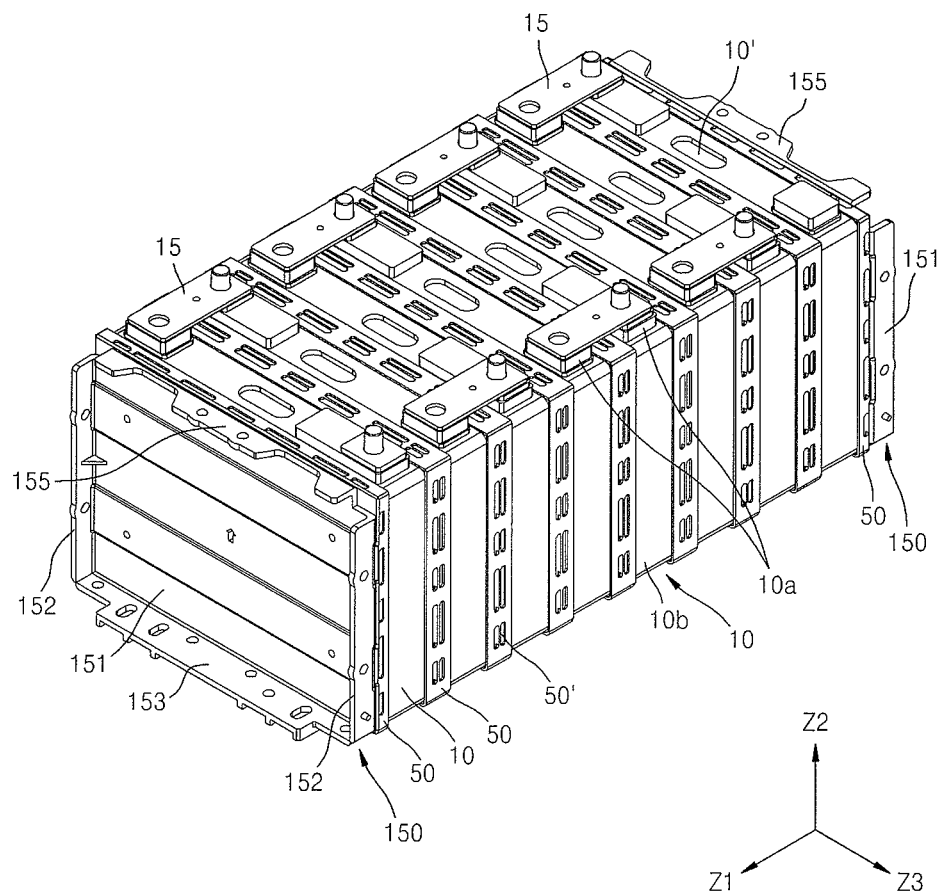
FIG. 2 is a perspective view illustrating the arrangement of battery cells illustrated in FIG. 1.

FIG. 2 is a perspective view illustrating the arrangement of the battery cells 10 illustrated in FIG. 1. Referring to FIG. 2, the battery cells 10 may be a rechargeable battery, such as a lithium ion battery, and the lithium ion battery used as the battery cells 10 may be a cylindrical rechargeable battery, a rectangular rechargeable battery, or a polymer rechargeable battery, and the battery cells 10 are not limited to such batteries.

For example, each of the battery cells 10 may include a case 10b, an electrode assembly (not shown) housed by the case 10b, and an electrode terminal 10a that is electrically connected to the electrode assembly and protrudes outside the case 10b. For example, the electrode terminal 10a may constitute an upper portion of the battery cell 10 and may be exposed on the case 10b. Although not illustrated, the electrode assembly may include a cathode, a separator, and an anode, and may have a jelly-roll shape or a stack shape. The case 10b may house the electrode assembly, and the electrode terminal 10a may be formed outside the case 10b for electric connection between the electrode assembly and an external circuit.

For example, neighboring battery cells 10 may be electrically connected to each other through their electrode terminals 10a, and may be connected in series or parallel, and neighboring electrode terminals 10a may be connected to each other by a bus bar 15.

A safety vent 10' may be formed in the case 10b. The safety vent 10' has a relatively low rigidity, and thus, when a pressure applied inside the case 10b is equal to or higher than a set critical point, the safety vent 10' is broken and inner gas is exhausted therethrough.

A spacer 50 may be interposed between neighboring battery cells 10. The spacer 50 may electrically insulate neighboring battery cells 10 from each other. For example, the case 10b may have electrical polarity and an electric interference between the neighboring battery cells 10 may be prevented by interposing the spacer 50 therebetween.

In addition, the spacer 50 may provide a heat dissipation path between the battery cells 10, and to do this, the spacer 50 may have a heat dissipation hole 50'. As described later, the side plate 140 assembled to cover a side surface of the spacer 50 may have a heat dissipation hole 140' (see FIG. 1), and the heat dissipation hole 140' of the side plate 140 may be connected to the heat dissipation hole 50' of the spacer 50 which is located facing the heat dissipation hole 140' so as to provide a heat dissipation path between the battery cells 10.

The spacer 50 is interposed between the battery cells 10 to prevent a thermal expansion, that is, swelling of the battery cells 10. The case 10b of the battery cells 10 is formed of a deformable metal material, and when the spacer 50 is formed by using a hardly deformable material, such as a polymer, swelling of the battery cells 10 may be prevented.

In addition, the spacer 50 may be located, in addition to between neighboring battery cells 10, in contact with outer surfaces of outer most battery cells 10 in the row direction (Z1 direction). As illustrated in FIG. 2, end plates 150 are located on both sides of the battery pack in the row direction (Z1 direction) of the battery cells 10, and the spacer 50 may be located between the end plates 150 and the battery cells 10 to electrically insulate the end plates 150 from the battery cells 10.

The end plates 150 are located on both sides of the battery pack in the row direction (Z1 direction) of the battery cells 10. The surface of each of the end plates 150 may face an outer surface of the battery cell 10. In detail, the surface of each of the end plates 150 may contact the spacer 50 located outside the battery cells 10.

The end plate 150 pulls together the battery cells 10 into a single unit, and suppresses volumetric swelling of the battery cells 10 during charging and discharging and maintains resistant characteristics to prevent a decrease in electrical characteristics of the battery cells 10.

The end plate 150 may include a base plate 151, and flange portions 152, 153, and 155 that are bent from an edge of the base plate 151 in a direction away from the battery cells 10. The base plate 151 may have an area that sufficiently covers an outer surface of the battery cells 10.

The flange portions 152, 153, and 155 are bent from an edge of the base plate 151 in a direction away from the battery cells 10. The flange portions 152, 153, and 155 may include the flange portion 152 formed on each of side surfaces of the base plate 151, and upper and lower flange portions 153 and 155 respectively formed on upper and lower portions of the base plate 151.

As illustrated in FIG. 1, the flange portions 152, 153, and 155 may provide a coupling location for connection between the end plate 150 and neighboring elements, and for example, may mediate coupling between the side plate 140 and the top plate 120 which are assembled in contact with each other along a corner of the end plate 150. In addition, the flange portions 152, 153, and 155 may compensate for mechanical rigidity of the end plate 150.

The side flange portion 152 may provide a coupling location for mediating connection between the end plate 150 and the side plate 140, and an end of the side plate 140 overlapping the side flange portion 152 may be coupled to the side flange portion 152 through screw-coupling. To do this, a plurality of coupling holes may be formed in the side flange portion 152.

The side plate 140 is located on the side surface of the battery cells 10. The side plate 140 may cover side surfaces of the battery cells 10 arranged in a row. The side plate 140 may be located in a pair on facing side surfaces of the battery cells 10. The side plate 140 may extend in the row direction (Z1 direction) of the battery cells 10, and ends thereof may be respectively connected to the end plates 150 located on both sides of the battery pack. The side plate 140 may be screw-coupled to the side flange portion 152 formed on a side edge of the end plate 150. For example, the side plate 140 is located overlapping the side flange portion 152 and coupling holes are matched, and then, the side plate 140 and the side flange portion 152 are screw-coupled to each other by using a coupling element, such as a bolt and a nut. Through the screw-coupling, the side plate 140 and the side flange portion 152 may form a surface-contact while at least a portion of the side plate 140 and the side flange portion 152 contact each other.

The side plate 140 may have a plate shape, and a bent projection step 140a supporting a portion of a bottom of the battery cells 10. The side plates 140 located on facing side surfaces of the battery cells 10 may support the bottom of the battery cells 10 by using the bent projection step 140a in a facing direction of the side plates 140.

The projection step 140a may extend throughout the length of the side plate 140 in the row direction (Z1 direction) of the battery cells 10, and ends of the projection step 140a may be screw-coupled to the lower flange portion 153 of the end plate 150. To do this, the projection step 140a and the lower flange portion 153 may have coupling holes, and after the coupling holes are matched, the side plate 140 may be screw-coupled to the end plate 150 by using a coupling member that is assembled through the projection step 140a and the lower flange portion 153. The projection step 140a and the lower flange portion 153 may have a surface contact while in contact with each other at a corner of the battery pack. As described above, the side plate 140 is coupled to the lower flange portion 153 and the side flange portion 152 of the end plate 150, thereby forming a housing space for housing the battery cells 10 arranged in a row.

The side plate 140 may have a heat dissipation hole 140'. For example, a plurality of heat dissipation holes 140' may be formed at constant intervals in the row direction (Z1 direction) of the battery cells 10. The heat dissipation hole 140' may allow the battery cells 10 to have a contact with external air, thereby contributing to rapid exhaustion of driving heat generated by the battery cells 10.

A lower portion of the battery cells 10, excluding the portion thereof supported by the projection step 140a, may be exposed by the side plate 140, and through the lower portion of the battery cells 10 exposed by the side plate 140, a flow of external air may be allowed between the battery cells 10 and heat dissipation of the battery cells 10 may be promoted.

A boss member 145 for installing a circuit substrate (not shown) may be formed on a side plate 140. For example, the circuit substrate may be a battery management system (BMS). A surface of the side plate 140 may face side surfaces of the battery cells 10, and another surface of the side plate 140 may be provided to install a circuit substrate. For example, the circuit substrate monitors charging and discharging states of the battery cells 10 and controls charging and discharging operations of a battery pack.

For example, the boss member 145 may be located at four sites arranged in a lattice shape roughly corresponding to a rectangular or square circuit substrate, and when there are a plurality of circuit substrates, the boss member 145 may be located on sites of a multiple of four arranged in a lattice shape. Although not illustrated in FIG. 2, the circuit substrate may have a coupling hole, and a screw member passing through the coupling hole is coupled to the boss member 145 on the side plate 140, thereby fixing the circuit substrate on the side plate 140.

Figure 3:
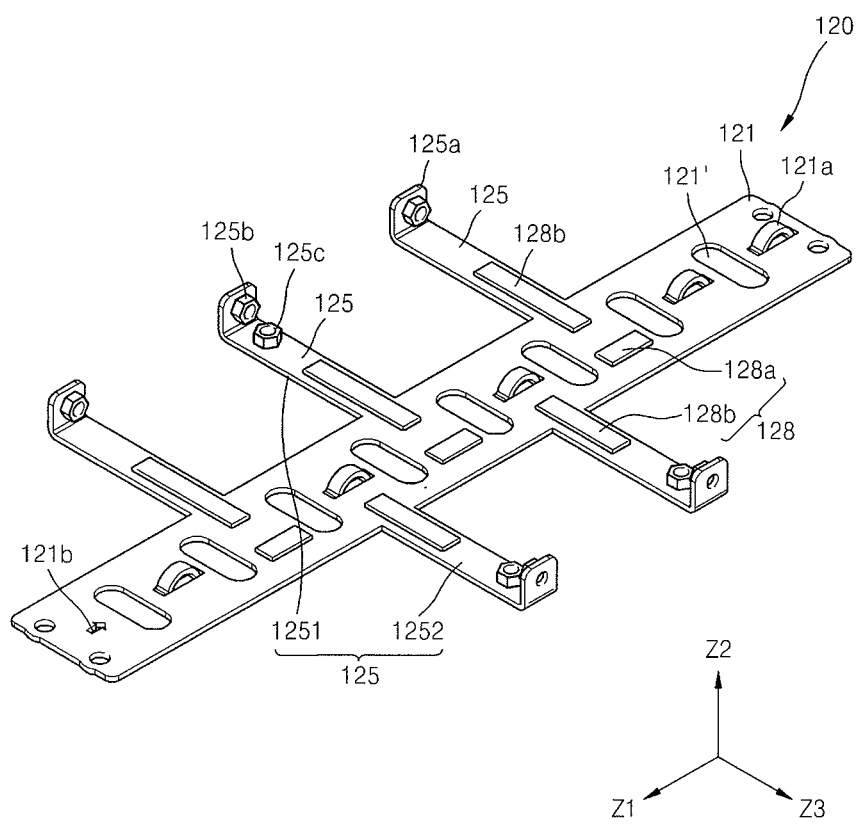
FIG. 3 is a perspective view of a top plate.

FIG. 3 is a perspective view of the top plate 120. Referring to FIGS. 1 and 3, the top plate 120 is located on the battery cells 10. The top plate 120 includes a base frame 121 extending across the center of an upper portion of the battery cells 10 in the row direction (Z1 direction) of the battery cells 10, and a support frame 125 extending from the base frame 121 to the side plate 140.

The base frame 121 may have openings 121' arranged in a lengthwise direction of the base frame 121, corresponding to the safety vents 10' of the battery cells 10. Ends of the base frame 121 may be respectively coupled to the end plates 150 located on both sides of the battery pack including the battery cells 10. The base frame 121 may be screw-coupled to the upper flange portion 155 formed on the upper edges of the end plate 150. For example, the base frame 121 is located overlapping the upper flange portion 155 and coupling holes are matched, and then, the base frame 121 and the upper flange portion 155 may be screw-coupled to each other by using a coupling element, such as a bolt and a nut. Through the screw-coupling, the base frame 121 and the upper flange portion 155 may form a surface-contact while at least a portion of the base frame 121 and the upper flange portion 155 contact each other.

The base frame 121 supports the end plates 150 with respect to each other arranged in the row direction (Z1 direction) of the battery cells 10 on opposite ends of the battery pack, and maintains a constant interval between the end plates 150, thereby suppressing swelling of the battery cells 10 in the row direction thereof and preventing deterioration of charging and discharging characteristics according to deformation of the battery cells 10.

The support frame 125 extends across an upper portion of the battery cells 10 in a direction crossing the base frame 121, for example, a direction (Z3 direction) perpendicular to the base frame 121 and is coupled to the side plate 140. The support frame 125 may be integrally formed with the base frame 121.

For example, the support frame 125 has an end extending from the base frame 121, and the other end that extends from the end and is coupled to the side plate 140. For example, the end of the support frame 125 may integrally extend from the base frame 121, and the other end of the support frame 125 may be screw-coupled to the side plate 140. To do this, the other end of the support frame 125 is bent to face the side plate 140 and may have a bending portion 125a overlapping the side plate 140.

The side plate 140 may be coupled to the bending portion 125a while overlapping each other, and a connection coupling member 125b may be formed on the bending portion 125a. For example, the coupling hole 140' of the side plate 140 and the connection coupling member 125b of the bending portion 125a are position-arranged to each other, and then, the through-hole coupling member 171 which has passed the side plate 140, is coupled to the connection coupling member 125b, thereby completing coupling of the side plate 140 and the support frame 125.

For example, the through-hole coupling member 171 and the connection coupling member 125b may respectively include a bolt and a nut. The through-hole coupling member 171 may pass through the side plate 140 and the support frame 125 which overlap with respect to each other, and may then be coupled to the connection coupling member 125b fixed on the support frame 125. According to another embodiment of the present invention, without screw-coupling, the bending portion 125a of the support frame 125 may be coupled to the side plate 140 by welding.

The support frame 125 supports the side plates 140 with respect to each other arranged on both ends of the battery pack, and maintains a constant interval between the side plates 140, thereby suppressing swelling of the battery cells 10 in a side-surface direction thereof and preventing deterioration of charging and discharging characteristics according to deformation of the battery cells 10.

For example, the battery cells 10 are assembled while being pressed by the base frame 121 or the side plate 140 in the row direction (Z1 direction), and due to the pressure, the battery cells 10 swells in the side-surface direction (Z3 direction), and thus, the side plate 140 may be deformed outward.

The support frame 125 allows the side plates 140 arranged on both sides of the battery pack including the battery cells 10 to be coupled to each other at a plurality of sites, thereby pressing the battery cells 10 in the side-surface direction (Z3 direction) and preventing bending outward of the side plates 140 according to swelling of the battery cells 10. The deformation of the battery cells 10 may result in deterioration of discharge characteristics. Accordingly, such a structure may prevent deformation of the battery cells 10 and may constantly maintain charging and discharging characteristics.

The support frame 125 may provide a mechanical rigidity to resist to a rotational moment and an axial distortion with respect to the row direction (Z1 direction) of the battery cells 10 as a rotational center. That is, the support frame 125 may support the side plates 140 in such a way that the side plates 140 are arranged at a constant interval with respect to each other, thereby providing a sufficient rigidity against the axial rotation and axial distortion of the battery pack.

The support frame 125 may include a first support frame 1251 extending toward the first side plate 141 from a side of the base frame 121, and a second support frame 1252 extending toward the second side plate 142 from the other side of the base frame 121. The first and second support frames 1251 and 1252 may extend from facing sides of the base frame 121, and may be arranged in a zigzag shape in the lengthwise direction of the base frame 121.

At least one bead portion 128 may be formed on the top plate 120. The bead portion 128 may be provided as a separate element attached to the base frame 121 and the support frame 125, and may enhance the mechanical rigidity of the top plate 120.

The top plate 120 supports the side plates 140 in such a way that the side plates 140 are spaced apart from each other at a constant interval, thereby suppressing swelling of the battery cells 10 and providing a mechanical rigidity for resisting to the axial rotation and the axial distortion of the battery pack with respect to the row direction (Z1 direction) of the battery cells 10. The bead portion 128 may enhance the rigidity of the top plate 120 to provide sufficient rigidity against swelling of the battery cells 10 or the axial rotation or the axial distortion of the battery pack.

For example, the bead portion 128 may include a first bead portion 128a formed on the base frame 121, and a second bead portion 128b crossing a boundary between the base frame 121 and the support frame 125. A plurality of first bead portions 128a may be arranged along the base frame 121, and may be formed between openings 121'. The first bead portion 128a may extend along the base frame 121 to provide a structural rigidity in a lengthwise direction of the base frame 121.

The second bead portion 128b may extend from the base frame 121 onto the support frame 125. The second bead portion 128b may extend in a lengthwise direction of the support frame 125 to provide a structural rigidity in the lengthwise direction of the support frame 125.

For example, the first and second bead portions 128a and 128b respectively extend in the lengthwise direction of the base frame 121 and in the lengthwise direction of the support frame 125 to provide rigidity to the respective lengthwise directions, thereby spacing the end plates 150 and the side plates 140 from each other at constant intervals and suppressing swelling or distortion deformation of the battery cells 10.

Referring to FIG. 1, a cover member 180 may be located on the top plate 120. The cover member 180 may cover the electrode terminals 10a of the battery cells 10 and the bus bar 15 connecting the electrode terminal 10a, and may insulate the electrode terminals 10a and the bus bar 15 from an external environment. The cover member 180 may be formed of an insulating material, for example, may be formed of a plastic material. The cover member 180 may cover the battery cells 10, and may expose some electrode terminals 10a that constitute an external connection terminal of the battery pack.

The cover member 180 may be coupled on the top plate 120. For example, the cover member 180 and the top plate 120 may form a mechanical coupling by using a through-hole coupling member (not shown), such as a bolt. To do this, a connection coupling member 125c may be formed on the support frame 125 of the top plate 120.

A coupling hole of the cover member 180 is matched with the connection coupling member 125c of the support frame 125, and then, the through-hole coupling member (not shown) passing through the cover member 180 is coupled to the connection coupling member 125c to position-fix the cover member 180. For example, the through-hole coupling member (not shown) and the connection coupling member 125c may respectively include a bolt and a nut.

Figure 4:
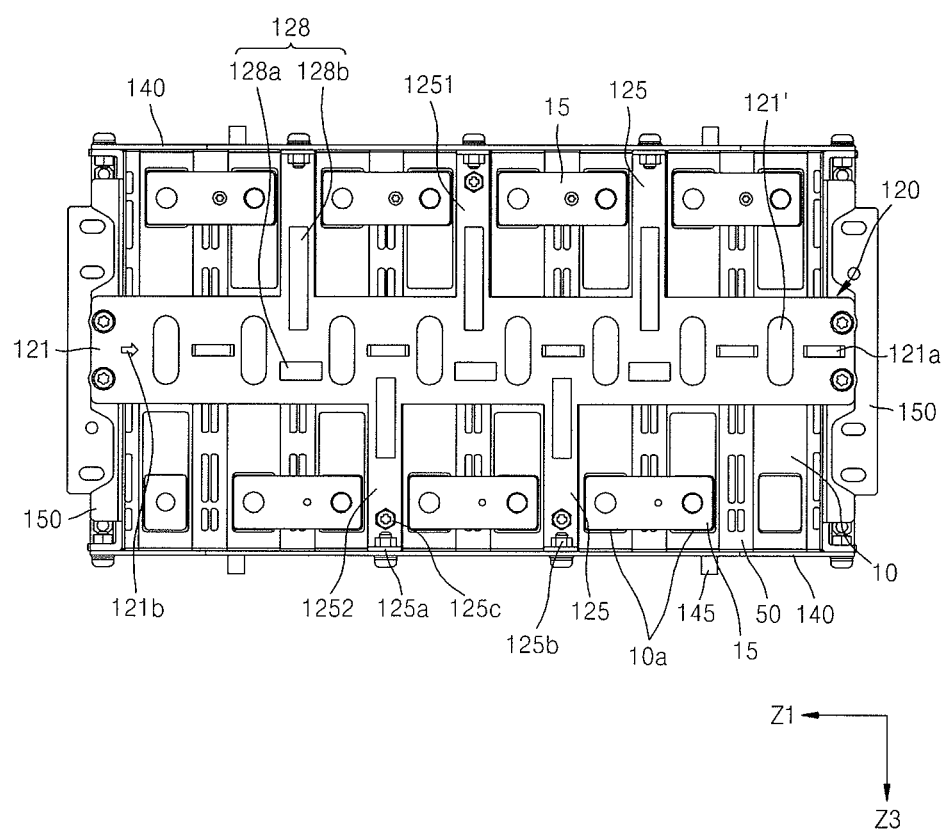
FIG. 4 is a top view of the battery pack illustrating a configuration of a bus bar and a top plate.

FIG. 4 is a top view of the battery pack illustrating a configuration of the bus bar 15 and the top plate 120. Referring to FIG. 4, the battery cells 10 of the battery pack may be electrically connected to each other via the bus bar 15, for example, may be connected in series. The bus bar 15 electrically connects different battery cells 10 to each other, and may be assembled by inserting the bus bar 15 into a protruding portion from the electrode terminal 10a of the battery cells 10 or by welding to the electrode terminal 10a. In this regard, the bus bars 15 may be assembled to be arranged in a zigzag form to sequentially connect the battery cells 10 in the row direction (Z1 direction) of the battery cells 10.

Together with the bus bar 15, the top plate 120 is located on the battery cells 10. In this regard, the bus bar 15 and the top plate 120 are arranged in such a way that the bus bar 15 and the top plate 120 do not mechanically/electrically interfere with each other.

In detail, a plurality of bus bars 15 extend in the direction (Z1 direction), to connect different pairs of neighboring battery cells 10 to each other. In addition, the support frame 125 of the top plate 120 is interposed between the bus bars 15, so that the support frame 125 may not interfere with the bus bars 15. For example, the support frame 125 may include first and second support frames 1251 and 1252 extending in opposite direction from the base frame 121, and the first and second support frames 1251 and 1252 may be arranged in a zigzag configuration along the lengthwise direction of the base frame 121. The support frame 125 may be formed correspondingly to the interval of the bus bars 15, and an allowable maximum number of the support frames 125 may be determined according to the arrangement of the bus bars 15.

Figure 5:
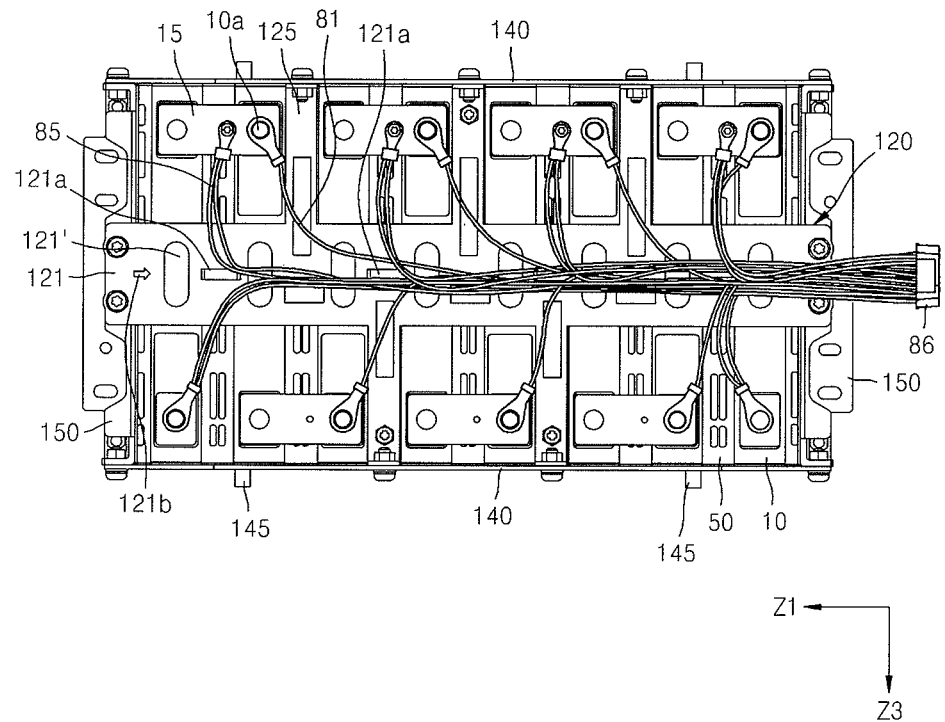
FIG. 5 illustrates an interconnection line structure arranged through a top plate.

FIG. 5 illustrates an interconnection line structure arranged through the top plate 120. Referring to FIG. 5, the top plate 120 may guide interconnection lines 81 and 85 extending from the electrode terminal 10a of each of the battery cells 10 or the bus bars 15. For example, the interconnection lines 81 and 85 may include interconnection lines 81 and 85 extending from the electrode terminals 10a or the bus bars 15 distributed in various places. In addition, the interconnection lines 81 and 85 may extend to the outside of the battery pack so as to deliver state information, for example, voltage information or temperature information, of the battery cells 10.

For example, an end of each of the interconnection lines 81 and 85 may be connected to the electrode terminals 10a or the bus bars 15, and the other ends may be connected to a battery management system (BMS) located outside the battery pack. In this regard, the interconnection lines 81 and 85 are gathered through the interconnection lines guide 121a formed on the top plate 120 and may form an extension path running toward the outside of the battery pack.

Referring to FIGS. 3 and 5, the interconnection lines guide 121a may be integrally formed with the top plate 120, specifically, the base frame 121. For example, the interconnection lines guide 121a may be formed as a ring-shaped fragment on the base frame 121. For example, a plurality of interconnection lines guides 121a may be arranged in a row along the extension direction (Z1 direction) of the base frame 121, and the extension path of the interconnection lines 81 and 85 may be formed along the arrangement direction. For example, the interconnection lines 81 and 85 may extend in the row direction (Z1 direction) of the battery cells 10.

A tie member (not shown) for pulling together the interconnection lines 81 and 85 may be coupled to the interconnection lines guide 121a, and the interconnection lines 81 and 85 may be tied by the tie member into one unit to handle the interconnection lines 81 and 85 easily. The interconnection lines 81 and 85 tied by the interconnection lines guide 121a may extend to the outside the battery pack along the extension path, and a connector 86 may be provided at the end of the extension. For example, the tie member may be formed of an insulating plastic material, and may be formed in a flexible wire shape.

Due to the interconnection lines guide 121a provided on the top plate 120, the interconnection lines 81 and 85 may be pulled together into one unit without tangling or winding, thereby increasing handling characteristics, and the interconnection lines 81 and 85 may extend toward the outside of the battery cells 10 along a determined extension path. By doing this, appearance characteristics of a formed battery pack may be improved, and repairing and maintaining workability of a formed battery pack may be improved.

An assembly direction display unit 121b indicating a desired extension direction of the interconnection lines 81 and 85 may be provided on the top plate 120. Since the assembly direction display unit 121b indicates an assembly direction of the interconnection lines 81 and 85, wrongly-assembling of the interconnection lines 81 and 85 may be prevented. For example, the assembly direction display unit 121b may be formed in an arrow shape, and may visually teach an assembling worker an extension direction of the interconnection lines 81 and 85.

For example, the interconnection lines 81 and 85 may include cell balancing interconnection lines 81 connected to the electrode terminals 10a of the battery cells 10, and temperature measuring interconnection lines 85 connected to the bus bars 15. The cell balancing interconnection lines 81 may transmit a voltage signal transmitted by each of the battery cells 10 to a BMS. In addition, the cell balancing interconnection lines 81 and the temperature measuring interconnection lines 85 are pulled together into one bundle by the interconnection lines guide 121a provided on the top plate 120 and extend toward the outside of the battery pack.

Figure 6:
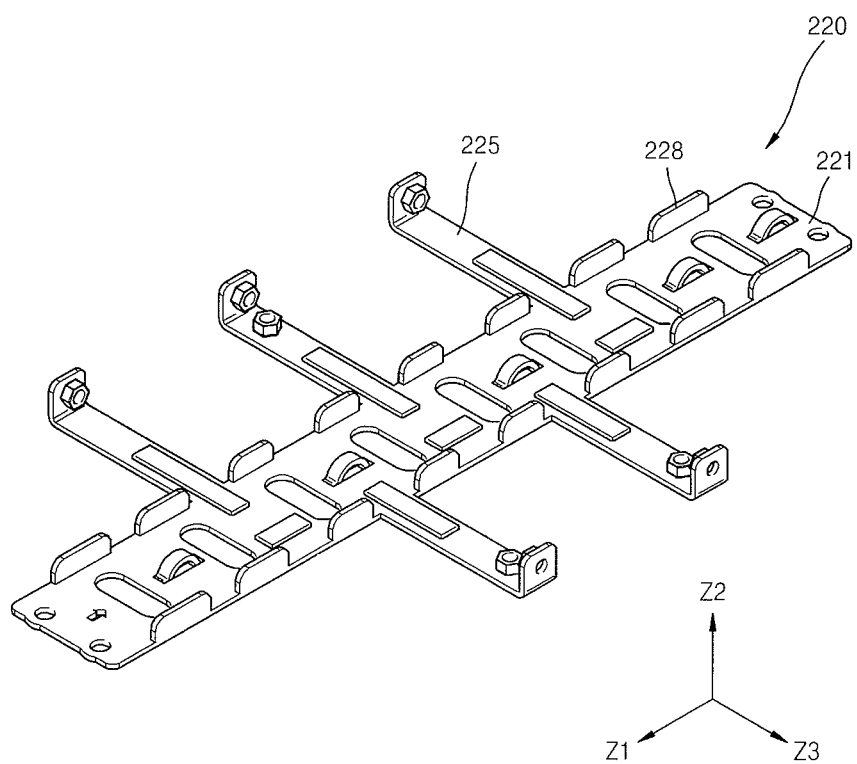
FIG. 6 is a perspective view of a top plate that is applicable to a battery pack according to an embodiment of the present invention.

FIG. 6 is a perspective view of a top plate 220 that is applicable to a battery pack according to an embodiment of the present invention. Referring to FIG. 6, a plurality of rigidity reinforcing portions 228 are formed along a side of the base frame 221. The rigidity reinforcing portions 228 may be formed in bent pairs, each pair facing each other on opposite sides of the base frame 221. The rigidity reinforcing portions 228 may be spaced apart from each other along lengthwise directions (Z1 direction) of opposite sides of the base frame 221, and the support frame 225 may extend between the rigidity reinforcing portions 228. For example, the rigidity reinforcing portions 228 are arranged in the lengthwise direction (Z1 direction) of the base frame 221, and may include a plurality of bent portions which are individualized by cutting portions, and the support frame 225 may extend through the cutting portions.

The rigidity reinforcing portion 228 may be formed to reinforce the rigidity of the base frame 221. The rigidity reinforcing portion 228 may reinforce the mechanical rigidity of the base frame 221, and for example, may provide a rigidity for resisting to warp deformation.

According to the present invention, as a structure for structurally binding battery cells arranged in a row, a pair of end plates is located on both sides of a battery pack including the battery cells along an arrangement direction of battery cells, and a pair of side plates is located on both sides of the battery cells. In particular, a top plate for maintaining an interval between the end plates constant and an interval between side plates constant is interposed between the end plates or the side plates, thereby effectively suppressing swelling of battery cells, providing sufficient rigidity for effectively resisting to outer distortion, and effectively preventing a decrease in charging and discharging characteristics occurring due to deformation of a formed battery pack.

In addition, due to interconnection lines guides for pulling a plurality of interconnection lines for transmitting state information of each of the battery cells of the battery pack together into one unit, the interconnection lines may be easily handled without tangling or winding, and the interconnection lines may extend toward the outside of the battery pack along a determined extension path. By doing so, an appearance quality of the battery pack may be improved, and repairing and maintaining workability of a formed battery pack may be improved.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack comprising:
    a pair of end plates arranged to face each other;
    a plurality of battery cells having a length a height and a width arranged between the end plates in a first direction that extends across the width of the battery cells;
    a pair of side plates that cover facing side surfaces of the battery cells and are coupled to the end plate; and
    a top plate that extends in the first direction and is connected to the end plates so as to maintain an interval between the end plates constant wherein the top plate further extends in a second direction, different from the first direction that extends across the length of the battery cells and connects to the side plates located on the sides of the battery cells in the lengthwise direction to maintain an interval between the side plates constant and is located above in a protruding direction of electrode terminals of the battery cells and wherein the top plate comprises a base frame extending in a first direction between the end plates and a first and a second support frame extending from the base frame toward the first and second side plates, wherein the first side plate is different from the second side plate;
    a plurality of bus bars that electrically connect electrode terminals of neighboring battery cells to each other, and
    the first and second support frames extend through an interval between the bus bars and wherein base frame and the first and the second support frame are sized so that the upper surfaces of the plurality of batteries are exposed and wherein the first and second support frames are arranged in a zigzag shape along a lengthwise direction of the base frame.

2. The battery pack of claim 1, wherein the first and second support frames extend in a direction that is perpendicular to the first direction.

3. The battery pack of claim 1, wherein an end of each of the first and second support frames integrally extends from the base frame, and
    the other end of each of the first and second support frames has a bending portion that faces the first or second side plate.

4. The battery pack of claim 3, wherein the bending portion has a connection coupling member that is coupled to a through-hole coupling member passing through the first and second side plates.

5. The battery pack of claim 4, wherein the through-hole coupling member and the connection coupling member respectively comprise a bolt and a nut.

6. The battery pack of claim 1, wherein the top plate comprises:
    a base frame and a support frame which respectively extend in the first and the second directions, wherein the first direction is different from the second direction; and
    a bead portion that is attached to at least one of the base frame and the support frame to compensate for mechanical rigidity and has a plate shape.

7. The battery pack of claim 6, wherein the bead portion comprises:
    a first bead portion extending in the first direction on the base frame; and
    a second bead portion extending in the second direction across the base frame and the support frame.

8. The battery pack of claim 1, wherein the top plate has a rigidity reinforcing portion for reinforcing mechanical rigidity, wherein the rigidity reinforcing portion is bent.

9. The battery pack of claim 8, wherein the top plate comprises a base frame and a support frame which respectively extend in first and second directions, wherein the first direction is different from the second direction, and
    the rigidity reinforcing portion is bent in opposite directions on sides of the base frame.

10. The battery pack of claim 9, wherein the rigidity reinforcing portion is arranged in the lengthwise direction of the base frame, and has a plurality of bent portions that are individualized by cutting portions, and
    the support frame extends through the cutting portions.

11. The battery pack of claim 1, wherein the side plates further comprises
    bent projection steps that cover a portion of a bottom of the battery cells and are bent in a direction in which the bent projection steps face each other.

12. The battery pack of claim 11, wherein the bent projection steps of the side plates are coupled to a flange of end plates.

13. The battery pack of claim 1, further comprising:
    a bus bar for electrically connecting electrode terminals of neighboring battery cells, and
    an interconnection lines guide that is provided on the top plate and guides a plurality of interconnection lines connected to the electrode terminals of battery cells or the bus bar.

14. The battery pack of claim 13, wherein the interconnection lines guide comprises a plurality of hook-shaped fragments arranged in the first direction, and
    the interconnection lines are pulled together by a tie member coupled to the interconnection lines guide.

15. The battery pack of claim 14, wherein the interconnection lines comprises
    cell balancing interconnection lines connected to the battery cells, and
    temperature measuring interconnection lines connected to the bus bar,
    wherein the cell balancing interconnection lines and the temperature measuring interconnection lines are pulled together along the interconnection lines guide and extend in the first direction.

16. The battery pack of claim 13, wherein
    an assembly direction display unit is provided on the top plate to indicate an extension direction of the interconnection lines connected to the electrode terminal of the battery cell or the bus bar.

17. The battery pack of claim 1, further comprising:
    an insulating cover member coupled to the top plate, and
    a connection coupling member to which a through-hole coupling member passing through the insulating cover member is coupled, formed on the top plate.

* * * * *